United States Patent [19]
Teraoka et al.

[11] Patent Number: 5,537,149
[45] Date of Patent: Jul. 16, 1996

[54] DISPLAY DEVICE

[75] Inventors: Shinji Teraoka, Moriya-machi; Yasuhiro Sato, Kashiwa, both of Japan

[73] Assignee: Victor Company of Japan, Ltd., Yokohama, Japan

[21] Appl. No.: 49,536

[22] Filed: Apr. 20, 1993

[30] Foreign Application Priority Data

| Apr. 22, 1992 | [JP] | Japan | 4-129527 |
| Aug. 31, 1992 | [JP] | Japan | 4-255871 |

[51] Int. Cl.$^6$ .............................. H04N 5/265; H04N 7/01
[52] U.S. Cl. ........................ 348/556; 348/445; 348/913; 345/132
[58] Field of Search ...................... 358/11, 12, 141, 358/183, 140; 345/115, 132; 348/445, 446, 469, 913, 451, 436, 458, 556, 581; H04N 5/265, 5/335, 5/68, 7/101

[56] References Cited

U.S. PATENT DOCUMENTS

| 4,605,952 | 12/1986 | Powers . | |
| 4,949,167 | 8/1990 | Isnardi et al. | 358/12 |
| 4,967,263 | 10/1990 | Dieterich | 358/11 |
| 5,079,632 | 1/1992 | Kawai et al. | 358/141 |
| 5,132,793 | 7/1992 | Hirahata et al. | 358/141 |
| 5,136,398 | 8/1992 | Rodriguez-Cavazos et al. | 348/445 |
| 5,168,358 | 12/1992 | Ishizu et al. | 358/140 |
| 5,182,644 | 1/1993 | Kimata et al. | 348/451 |
| 5,208,669 | 5/1993 | Richards | 348/445 |
| 5,243,421 | 9/1993 | Nagata et al. | 348/445 |
| 5,274,449 | 12/1993 | Keesen | 348/469 |
| 5,436,669 | 7/1995 | Baba et al. | 348/556 |

FOREIGN PATENT DOCUMENTS

| 0082953 | 7/1983 | European Pat. Off. . |
| 0416619 | 3/1991 | European Pat. Off. . |
| 62-291278 | 12/1987 | Japan . |
| 3-54980 | 3/1991 | Japan . |
| 3-175782 | 7/1991 | Japan . |
| 4-44276 | 7/1992 | Japan . |
| 9119378 | 12/1991 | WIPO . |

OTHER PUBLICATIONS

Operating manual for the "Model AV-36W1 Television Receiver" designed and manufactured by Victor Company of Japan, Ltd.

Patent Abstracts of Japan, vol. 13, No. 46 (E-711), 2 Feb. 1989 & JP-A-63 240 279 (Matsushita), 5 Oct. 1988.

*Primary Examiner*—Richard Hjerpe
*Assistant Examiner*—Steven J. Saras
*Attorney, Agent, or Firm*—Michael N. Meller

[57] ABSTRACT

A display device having a display screen of 16:9 aspect ratio for displaying fully a video image of 4:3 aspect ratio without leaving a blank space and a display device having a display screen of 4:3 aspect ratio for displaying fully a video image of 16:9 aspect ratio without leaving a blank space are disclosed. The former device includes at least one of the first circuitry for non-linearly expanding a horizontal display scale of the 4:3 image being fully displayed to fill up the 16:9 screen, in right and left portions of the image relative to the horizontal center of the image as such that a rate of non-linear expansion is increased as a horizontal position within the image becomes distant from a horizontal center of the image, and second circuitry for non-linearly compressing a vertical display scale of the 4:3 image being fully displayed to fill up the 16:9 screen, in upper and lower portions of the image relative to the vertical center of the image as such that a rate of non-linear compression is increased as a vertical position within the image becomes distant from a vertical center of the image. In the latter device, the horizontal scale is non-linearly compressed, and the vertical scale is non-linearly expanded.

23 Claims, 13 Drawing Sheets (A) VIDEO SIGNAL (B) WRITE CLOCK (C) READ CLOCK

DISPLAY DEVICE

BACKGROUND OF THE INVENTION

1. Field of the Invention

The present invention relates to a display device having a display screen whose aspect ratio is 16:9 and a display device having a display screen whose aspect ratio is 4:3 and, particularly, to a display device in which a displaying method is improved such that it can display an image whose aspect ratio is different from these aspect ratios of the display screen.

2. Description of the Related Art

Recently, a video screen having an aspect ratio of 16:9 which provides better presence than that obtainable by a conventional aspect ratio of 4:3 is developed for such as high-difinition TV reception, etc., and is becoming popular. With such recent tendency, a display device having display screen whose aspect ratio is 16:9 has become commercially available to display a video image having its aspect ratio of 16:9 or a conventional video image having its aspect ratio of 4:3. Further, a display of video image having its aspect ratio of 16:9 has been also attempted to be displayed on a conventional display device having a display screen having its aspect ratio of 4:3. That is, it has been tried to display, on a display screen of a display device, a video image whose aspect ratio is different from that of the display screen.

When a video image whose aspect ratio is 4:3 is displayed on a display screen of 16:9 aspect ratio, any of the following three methods are conceivable:

(1) An image of 4:3 aspect ratio is displayed on a center of a display screen having the aspect ratio of 16:9 by adjusting with a vertical length (height) of the image being matched with a vertical length of the screen, as shown in FIG. 1(A) so that the original aspect ratio of the image is maintained leaving unfilled areas at both sides of the screen. This is realized by deflecting the electron beam horizontally within a hatched range in FIG. 1(A) or time-compressing the video signal.

(2) An image of 4:3 aspect ratio is displayed on a display screen having the aspect ratio of 16:9 by adjusting a horizontal length (width) of the image being matched with a horizontal length of the screen while an upper and lower edge portions of the image being cut off, as shown in FIG. 1(B). This is realized by deflecting electron beam vertically over a hatched range in FIG. 1(B).

(3) An image of 4:3 aspect ratio is displayed on a display screen having the aspect ratio of 16:9 by adjusting a vertical length of the image so as to match the height of the screen and expanding linearly a horizontal length of the image to fill the screen as shown in FIG. 1(C). In this case, the original aspect ratio of the image is no longer maintained.

On the other hand, when a video image of 16:9 aspect ratio is displayed on a display screen of a display device, whose aspect ratio is 4:3, any of the following three methods is conceivable:

(4) An image of 16:9 aspect ratio is displayed on a center portion of a display screen having the aspect ratio of 4:3 by adjusting a horizontal length of the image being matched with a horizontal length of the screen, as shown in FIG. 2(A) so that the aspect ratio of the image is maintained. This is realized by deflecting the electron beam vertically within a hatched range in FIG. 2(A).

(5) An image of 16:9 aspect ratio is displayed on a display screen having the aspect ratio of 4:3 by adjusting a vertical length of the image being matched with a vertical length of the screen while a right and left portions of the image being cut off, as shown in FIG. 2(B). This is realized by deflecting the electron beam horizontally over a hatched range in FIG. 2(B) or time-expanding the video signal.

(6) An image of 16:9 aspect ratio is displayed on a display screen having the aspect ratio of 4:3 by adjusting a horizontal and a vertical length of the image being matched with horizontal and vertical lengths of the screen by linearly compressing the image horizontally and linearly expanding the image vertically to fill the screen as shown in FIG. 2(C).

Further, there is a video image of so-called vista size, which is transmitted as a 4:3 aspect ratio image signal, but its visible area has an aspect ratio of 16:9, such image may be displayed as it is within a screen of 4:3 aspect ratio as shown in FIG. 2(A), or such image may be displayed in such manner as shown in any of FIGS. 2(B) and 2(C).

However, these conceivable methods (1) to (6) have the following drawbacks:

In the method (1) or (4) in which an image is displayed on a part of a screen, the size of the displayed image is inevitably small. Further, since straight boundaries between the displayed image and an unfilled screen area (a pair of black belts) are visible, a raster distortion (if any) looks conspicuous. In addition, when this display mode is used for a long period of time, a permanent difference in raster luminance between the used portion and the unused portion of the screen of a cathode ray tube, may develop as a "burnt screen".

In the method (2) or (5), it is impossible to watch the cut-out portions of the image.

In the method (3), an image displayed is distorted since the original 4:3 image is no longer maintained, instead, the original image is vertically compressed and horizontally expanded.

This is also true for the method (6) in which the original 16:9 aspect ratio image is no longer maintained, instead, the original image is vertically expanded and horizontally compressed.

SUMMARY OF THE INVENTION

An object of the present invention is to eliminate the above mentioned drawbacks of the conceivable display devices.

Another and specific object of the present invention is to provide a display device comprising a display screen of 16:9 aspect ratio for displaying fully a video image of 4:3 aspect ratio without leaving a blank space in the 16:9 screen, the display device further comprising at least one of:

the first circuitry for non-linearly expanding a horizontal display scale of the 4:3 image being fully displayed to fill up the 16:9 screen, in right and left portions of the image relative to the horizontal center of the image as such that a rate of non-linear expansion is increased as a horizontal position within the image becomes distant from a horizontal center of the image; and the second circuitry for non-linearly compressing a vertical display scale of the 4:3 image being fully displayed to fill up the 16:9 screen, in upper and lower portions of the image relative to the vertical center of the image as such that a rate of non-linear compression is increased as a vertical position within the image becomes distant from a vertical center of the image. In the latter device, the horizontal scale is non-linearly compressed, and the vertical scale is non-linearly expanded.

Another object of the present invention is to provide a display device comprising a display screen of 4:3 aspect ratio for displaying fully a video image of 16:9 aspect ratio without leaving a blank space in the 4:3 screen, the display device further comprising at least one of:

the first circuitry for non-linearly compressing a horizontal display scale of the 16:9 image being fully displayed to fill up the 4:3 screen, in right and left portions of the image relative to the horizontal center of the image as such that a rate of non-linear compression is increased as a horizontal position within the image becomes distant from a horizontal center of the image; and the second circuitry for non-linearly expanding a vertical display scale of the 16:9 image being fully displayed to fill up the 4:3 screen, in upper and lower portions of the image relative to the vertical center of the image as such that a rate of non-linear expansion is increased as a vertical position within the image becomes distant from a vertical center of the image.

Still another object of the present invention is to provide a display device comprising first circuitry having a display screen of 4:3 aspect ratio for displaying a visible picture of 16:9 aspect ratio being included as a part of image signal of 4:3 aspect ratio, the display device further comprising at least one of:

the second circuitry for non-linearly compressing a horizontal display scale of the visible picture being fully displayed to fill up the 4:3 display screen, in right and left portions of the visible picture with respect to a horizontal center portion of the visible picture in such a manner that a rate of non-linear compression is increased as a horizontal position within the visible picture becomes distant from a horizontal center of the visible picture; and the third circuitry for non-linearly expanding a vertical display scale of the visible picture being fully displayed to fill up the 4:3 display screen, in upper and lower portions of the visible picture with respect to a vertical center portion of the visible picture in such a manner that a rate of non-linear expansion is increased as a vertical position within the visible picture becomes distant from a vertical center of the visible picture.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

An embodiment of the present invention will be described in detail with respect to the accompanying drawings.

First to third display methods for solving the problems in displaying a video image of 4:3 aspect ratio on a display screen having an aspect ratio of 16:9 and then embodiments for realizing these display methods will be described with reference to FIGS. 3 to 15.

In the first display method for solving the problems in displaying the video image of 4:3 aspect ratio on the display screen having the aspect ratio of 16:9, when the video image is displayed on the screen 10, the vertical length of the image is adjusted to match the height of the screen 10, and a horizontal display scale of image, which corresponds to an instantaneous horizontal scanning speed of electron beam of cathode ray tube, is increased with an increase of horizontal distance from a center of the screen, as exemplified by a displayed cross-hatch pattern shown in FIG. 4(A). In such a case, the original aspect ratio of the video image on the center area of the screen is maintained at substantially 4:3 although right and left portions of the image are deformed as shown by the example of monoscope signal (a test pattern) in FIG. 4(B).

Figure 5:
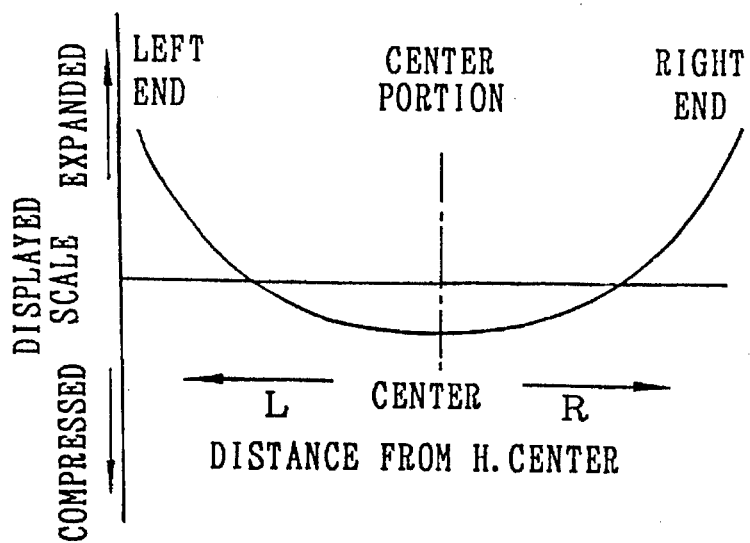
FIG. 5 shows a relationship between a horizontal position and a display scale in the first display method shown in FIG. 4.

FIG. 5 shows a relationship between a horizontal position on a display screen and a horizontal display scale, that is, a length of display per unit time. In FIG. 5, an ordinate indicates the display scale, that is, compression or expansion of the video image horizontally, and an abscissa indicates a horizontal distance from the center of the screen. The vertical length of the displayed image is adjusted to match the height of the screen similarly to the case shown in FIG. 1(C). From FIG. 5, it is clear that the image on the display screen is horizontally compressed uniformly in a center portion of the display screen while being horizontally expanded in right and left portions thereof with the expansion rate being increased with the increase of distance from the center.

As described, in the first display method, the video image having the aspect ratio of 4:3 is displayed substantially fully on the screen 10 having the aspect ratio of 16:9 by gradually expanding the displayed horizontal scale of the image with the expansion rate being increased with the increase of horizontal distance from the center of the screen.

First Embodiment

A first embodiment of the present invention by which the first display method mentioned above is realized will be described with reference to FIG. 3. In this embodiment, a cathode-ray tube (not shown) is used as the video image display device. The embodiment comprises a horizontal deflection output circuit including a horizontal output transistor 1, a damper diode 2, a resonance capacitor 3, a horizontal deflection coil 4, a correction (for "S"-shape waveform) capacitor 5 and a flyback transformer or horizontal output transformer 6, a correction capacitor 7 and a switch 8 for selectively connecting the correction (for "S"-shape waveform) capacitor 7 in parallel to the correction capacitor 5.

Figure 1A:
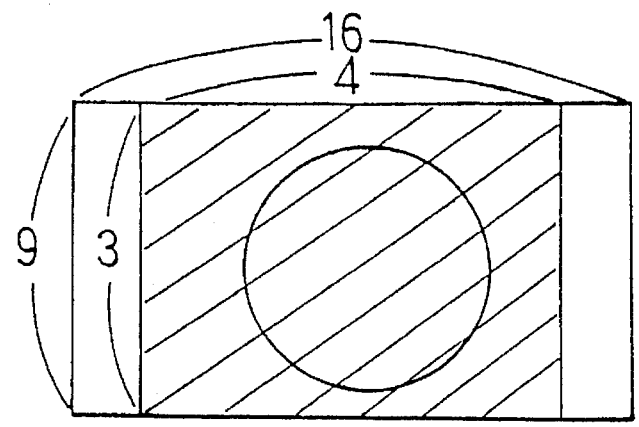
FIGS. 1 (A) through (C) illustrate a conceivable method for displaying a video image of 4:3 aspect ratio on a display device having a display screen having an aspect ratio of 16:9.
Figure 1B:
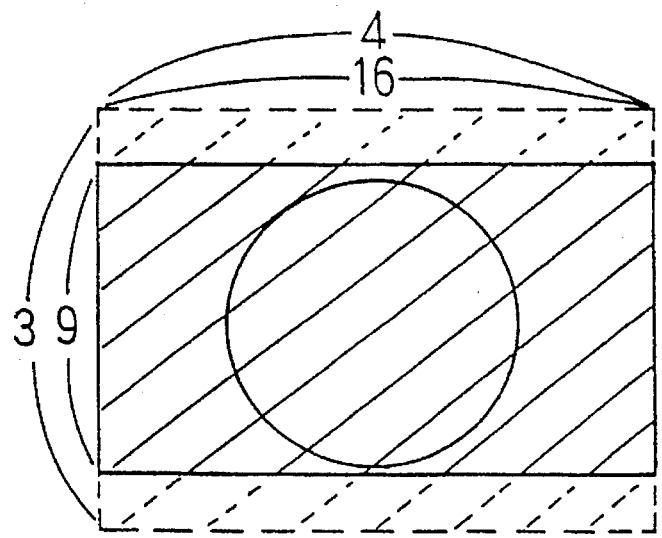
Figure 3:
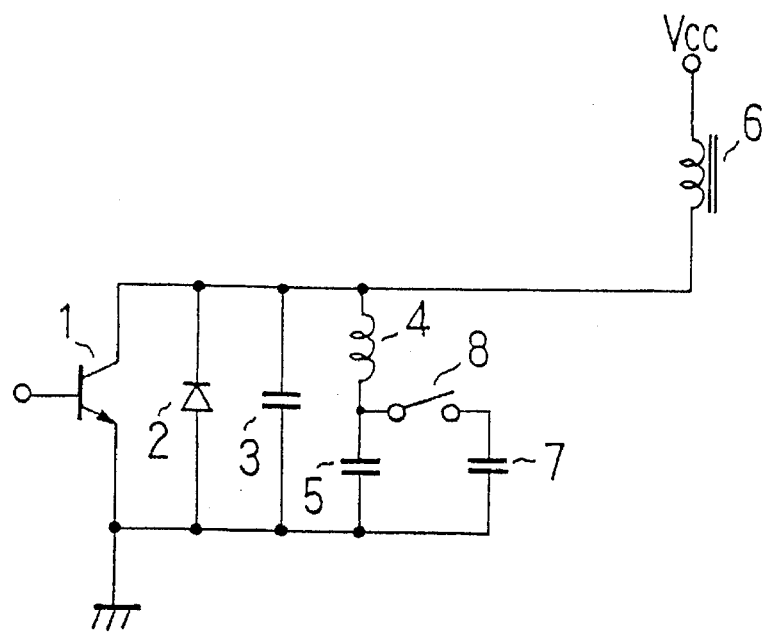
FIG. 3 shows a circuit diagram of a first embodiment of the present invention implementing a first display method for solving a problem in displaying a video image of 4:3 aspect ratio on the display device having the display screen having the aspect ratio of 16:9.

In FIG. 3, capacitance of the correction capacitor 5 is selected such that, when an image is displayed on a display screen of the cathode ray tube by opening the switch 8 and suitably selecting a source voltage Vcc to be applied to the transformer 6, the horizontal length of the image is made to a certain desired size which may be similar to the case shown in FIGS. 1 (C) or (A).

Figure 4:
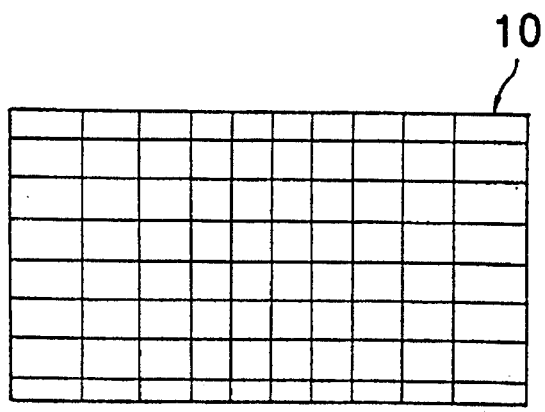
FIGS. 4 (A) and (B) illustrate the first display method for solving the problem in displaying the video image of 4:3 aspect ratio on the display device having the display screen having the aspect ratio of 16:9.
Figure 4:
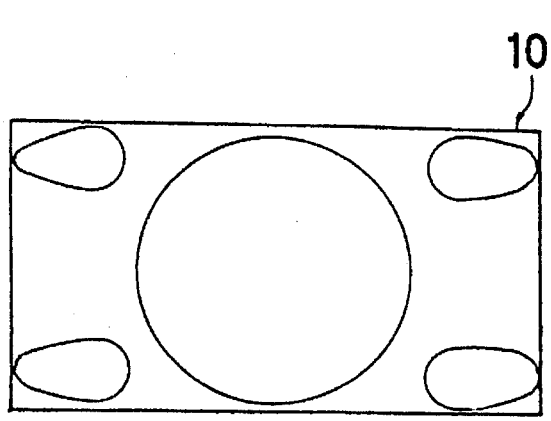

Further, when it is desired to display the image in the manner shown in FIG. 4, the switch 8 is turned on and the source voltage Vcc is increased such that a display area in horizontal direction becomes substantially coincident with the display screen. Since, with the switch 8 being turned on, the correction capacitor 7 is connected in parallel to the correction capacitor 5 and thus a composite capacitance thereof is increased, a horizontal deflection current flowing through the horizontal deflection coil 4 is modulated such that scanning speed of electron beam is increased with increase of horizontal distance from a center of the display screen as shown by a solid line in FIG. 6 thus the horizontal display scale is increased at both left and right end portions of the displayed image.

It should be noted that, since a deflection center of electron beam of the cathode ray tube is not coincident with a center of curvature of the screen which is rather substantially flat, the displayed image is expanded in both left and right portions thereof when the horizontal deflection current flowing through the deflection coil 4 is linearly changed with respect to time. Therefore, in general, the change of the horizontal deflection current is limited at start and end portions of the horizontal scanning period as shown by a dotted line in FIG. 6. This maintains the linearity of the display scale of image in normal.

Figure 1C:
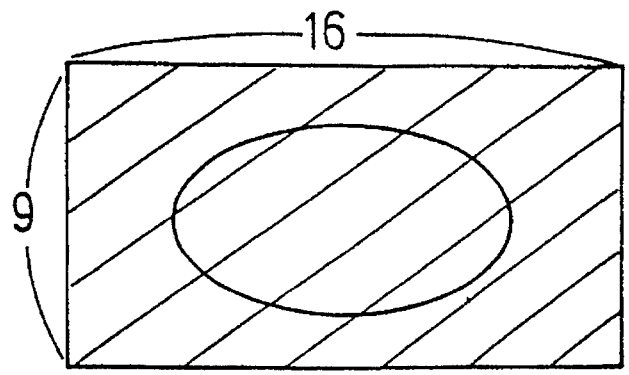

In this embodiment, the display method shown in FIG. 1(C) for instance, and the display method shown in FIG. 4 are selectively realized by switching ON and OFF the correction capacitor 7 which is added to the correction capacitor 5 with the switch—ON.

However, when it is required to realize only the display method shown in FIG. 4, it is enough to use only the correction capacitor 5 and preliminary selecting a capacitance thereof to a value optimal for the display method shown in FIG. 4. Further, it is possible to use three correction capacitors connected to the circuit and selectively obtain any of the three display methods shown in FIG. 1(A), FIG. 1(C) and FIG. 4 by suitably switching the correction capacitors.

2nd Embodiment

A second embodiment of the present invention by which the first display method can be realized will be described with reference to FIG. 7.

Figure 7:
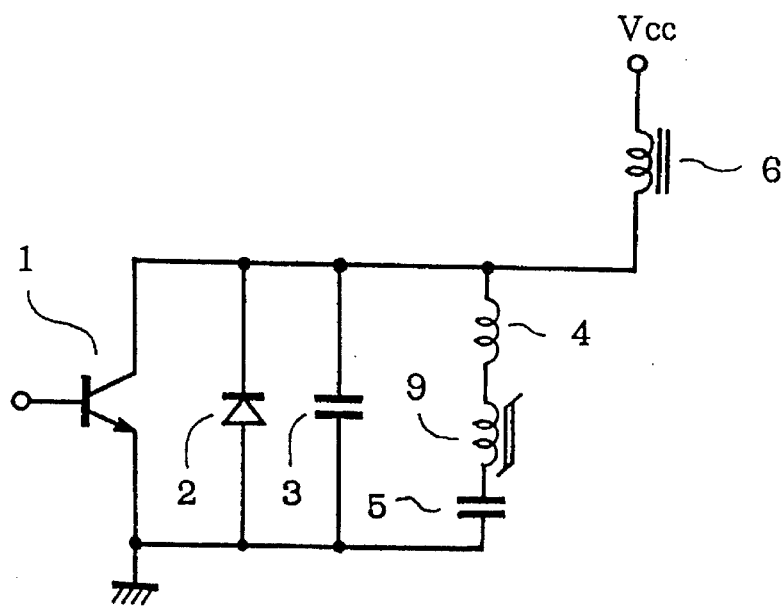
FIG. 7 shows a circuit diagram of a second embodiment of the present invention for realizing the first display method shown in FIGS. 4 (A) and (B)
Figure 8:
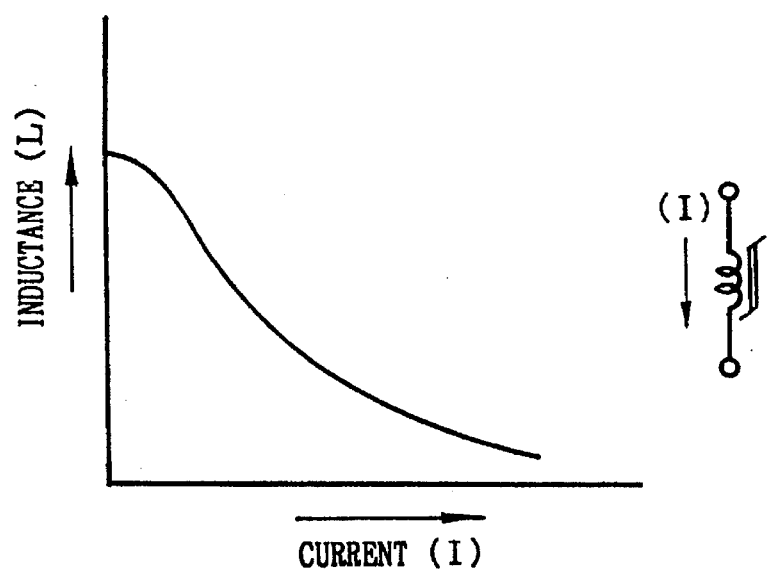
FIG. 8 shows an inductance characteristic in relation to a flowing current of a saturable coil shown in FIG. 7.

As shown in FIG. 7, like in the first embodiment, this embodiment 2 comprises a horizontal deflection output circuit including a horizontal output transistor 1, a damper diode 2, a resonance capacitor 3, a horizontal deflection coil 4, a correction capacitor 5 and a flyback transformer or horizontal output transformer 6, but a saturable inductance coil 9 is newly connected in series with the correction capacitor S. The saturable inductance coil 9 has a characteristics shown in FIG. 8. That is, its inductance L is reduced with an increase of horizontal deflection current flowing therethrough.

Figure 6:
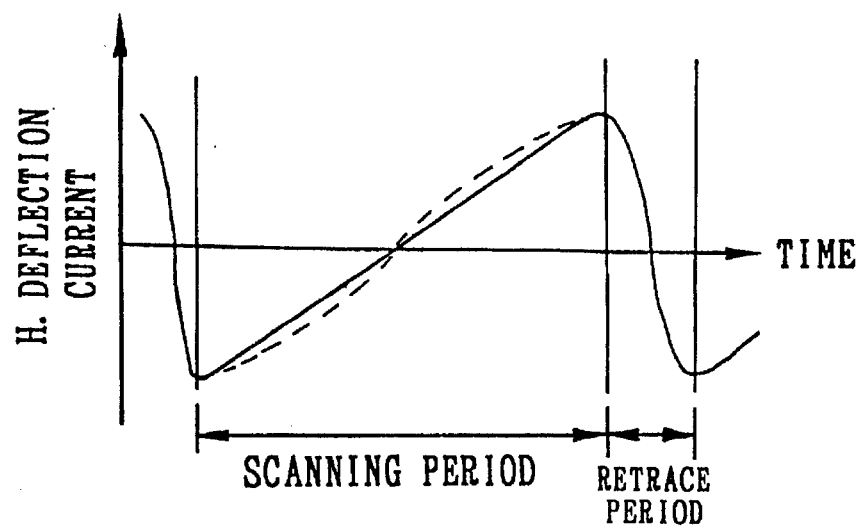
FIG. 6 shows a waveform of a horizontal deflection current flowing through a horizontal deflection coil in FIG. 3.

The inductance of the saturable coil 9 is large during a horizontal scanning period corresponding to the center portion of the screen where the horizontal deflection current is small, and the inductance is small during periods corresponding to both side portions of the screen where the horizontal deflection current is large. Therefore, as shown in FIG. 6, a variation of the deflection current at the center portion of the screen is limited while the deflection current varies largely in the side portions. Thus, the display scale in horizontal direction is increased with respect to that of the center portion, the increasing rate being larger with the increase of distance from the center.

3rd Embodiment

A third embodiment of the present invention by which the first display method can be realized will be described with reference to FIG. 9. In this embodiment, the first display method is realized by modulating a time axis of a video signal to be displayed such that the time axis is compressed in a center portion of the display screen and expanded in both side portions thereof, while keeping a total horizontal scanning time which corresponds to the horizontal display length to be unchanged.

Figure 9:
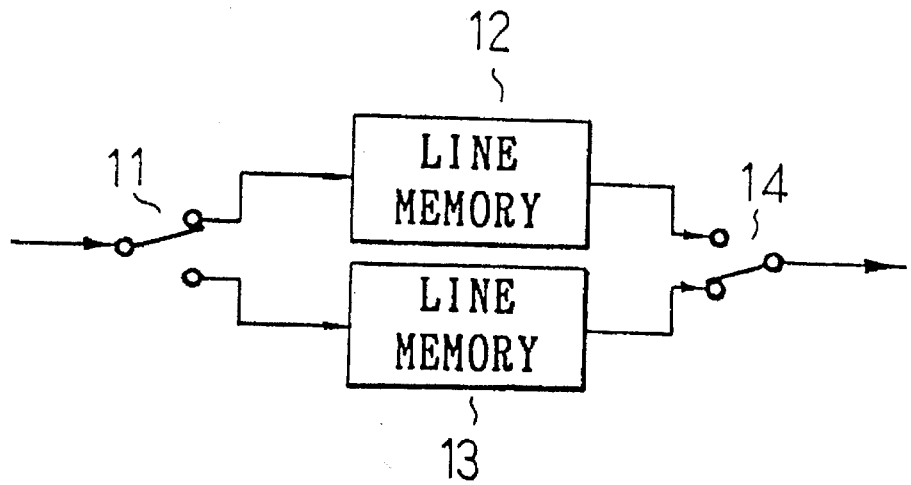
FIG. 9 shows a block circuit diagram of a third embodiment of the present invention for realizing the first display method shown in FIG. 4.
Figure 10:
FIG. 10 shows waveforms for explaining the third embodiment shown in FIG. 9.
Figure 10:
Figure 10:

As shown in FIG. 9, this embodiment 3 comprises switches 11 and 14 and a parallel circuit composed of line memories 12 and 13 disposed between the switches 11 and 14. A video signal is inputted to either of the line memories 12 or 13 by the switches 11 and 14. The video signal to be inputted to the switch 11 is one of the Y (luminance) signal as shown in FIG. 10(A), a color difference signal R-Y and a color difference signal B-Y. Therefore, in order to process these three signals, three of the circuit shown in FIG. 9 are practically required. The switch 11 is switched every horizontal line to write the video signal in the line memories 12 and 13 alternately at a timing of a write clock having a constant frequency. The write clock may be, for example, the so-called 4 fsc clock whose frequency is 4 times the frequency of color sub-carrier. The switch 14 is switched every horizontal line to read a content of the line memories alternately with a read clock which is FM modulated such that, as shown in FIG. 10(C), its frequency is low in both the starting and ending portions of one horizontal scanning line and high in a center portion thereof. Thus it is possible to make the horizontal display scale as shown in FIG. 5 similarly to the first embodiment.

4th Embodiment

Figure 12:
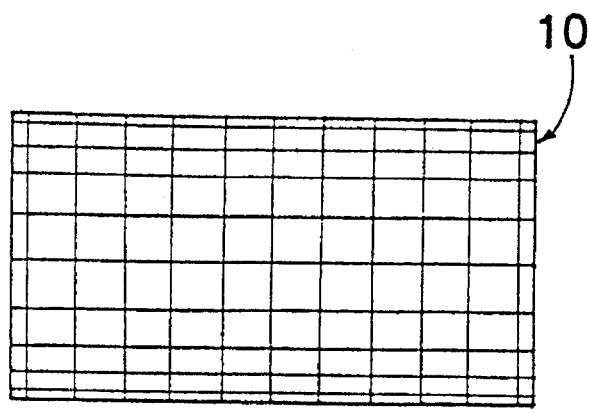
FIG. 12 illustrates the second display method for solving the problem in displaying the video image of 4:3 aspect ratio on the display device having the display screen having the aspect ratio of 16:9.

A second display method for solving the problem in displaying a video image having the aspect ratio of 4:3 on a display screen having the aspect ratio of 16:9, is to compress the vertical display scale, which corresponds to an instantaneous vertical scanning speed of electron beam of the cathode ray tube, with a compression rate being larger with an increase of vertical distance from the center of the screen as shown by a cross-hatch pattern in FIG. 12. In this case, the horizontal width of the image is expanded linearly to fill the screen 10 as shown in FIG. 1(C), and a portion of the image in the center portion of screen 10 can be displayed with its aspect ratio of 4:3 being substantially kept, on the other hand, upper and lower portions of the image are deformed.

Figure 13:
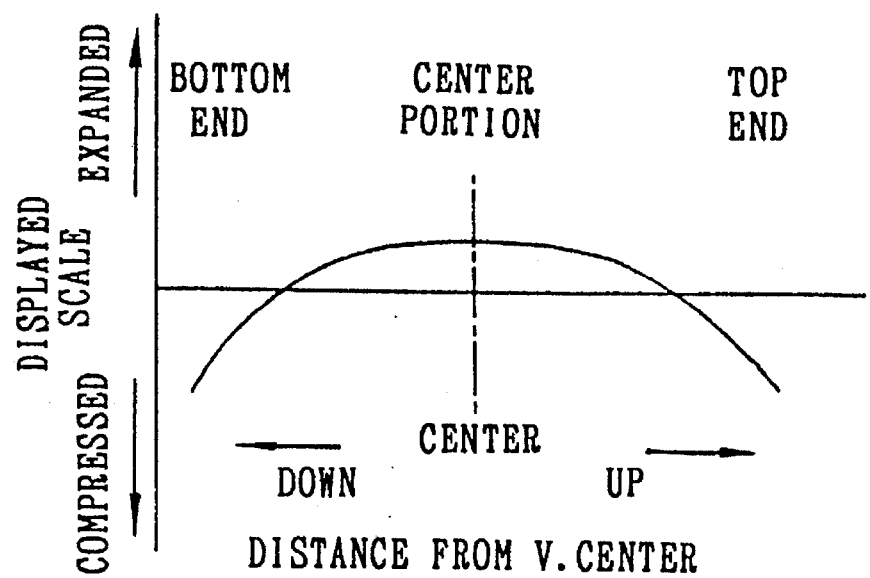
FIG. 13 shows a relationship between a vertical position and a display scale in the second display method shown in FIG. 12.

FIG. 13 shows a relation between the vertical position and the vertical display scale of image (displayed length per unit time) on the display screen. That is, the ordinate indicates a variation of the display scale and the abscissa indicates the vertical distance from the center of the display screen. The horizontal length of the image is linearly expanded to fill the screen, which corresponds to the state shown in FIG. 1(C).

It is clear from FIG. 13 that the displayed vertical scale of image is slightly increased in the center portion of the screen and compressed gradually with an increase of vertical distance from the center in both up and down directions of the screen. Thus, in the second display method, the video image having the aspect ratio of 4:3 is displayed on the display screen having the aspect ratio of 16:9 by compressing the vertical display scale in the upper and lower portions of the image with respect to the center portion thereof.

Figure 11:
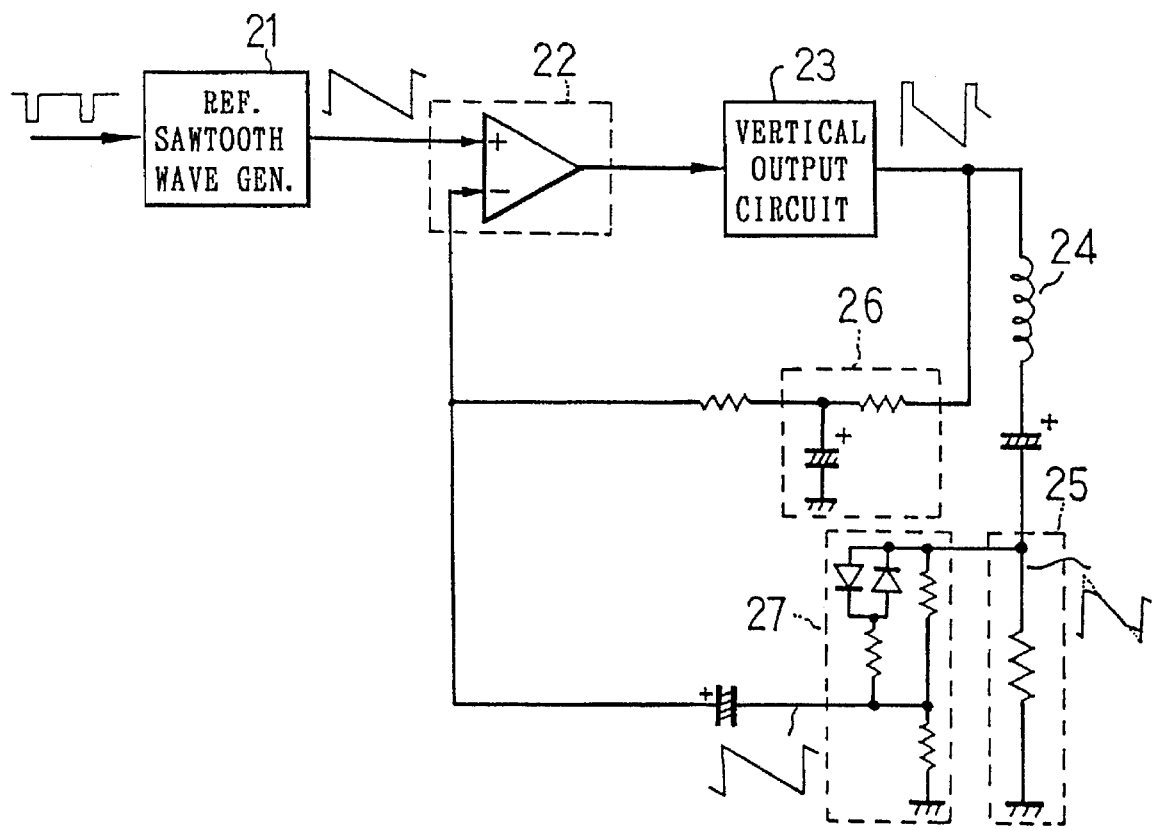
FIG. 11 shows a block circuit diagram of a fourth embodiment of the present invention implementing a second display method for solving the problem in displaying the video image of 4:3 aspect ratio on the display device having the display screen having the aspect ratio of 16:9.

A 4th embodiment of the present invention for realizing the second display method will be described with reference to FIG. 11, in which a cathode ray tube (not shown) is used as a video image display device. In FIG. 11, the embodiment comprises a vertical deflection circuit including a reference sawtooth wave generator circuit 21, a vertical drive circuit 22, a vertical output circuit 23, a vertical deflection coil 24, an A.C. component detection circuit 25 and a D.C. component detection circuit 26 and a linearity correction circuit 27 composed of diodes and resistors as shown.

In FIG. 11, the reference sawtooth wave generator circuit 21 is supplied with a vertical synchronizing signal and outputs a sawtooth wave. The sawtooth wave is supplied to the vertical drive circuit 22 whose output is supplied to the vertical output circuit 23. A D.C. component of an output voltage of the vertical output circuit 23 is detected by the D.C. component detection circuit 26 and is supplied to the vertical drive circuit 22 as a feedback signal and the A.C. component of an output current of the vertical output circuit 23 is detected by the A.C. component detection circuit 25 and is supplied to the vertical drive circuit 22 as another feedback signal.

The output of the A.C. component detection circuit 25 takes the form of the sawtooth wave whose upper and lower portions are sliced by the diodes of the linearity correction circuit 27 as shown in FIG. 11. Therefore, the vertical deflection current flowing through the vertical deflection coil 24 is modulated as such that the scanning speed of electron beam of the cathode ray tube is reduced in the upper and lower portions of the display screen as shown by a solid line in FIG. 14, thus the displayed vertical display scale in these portions is compressed at the upper and lower portions.

Figure 14:
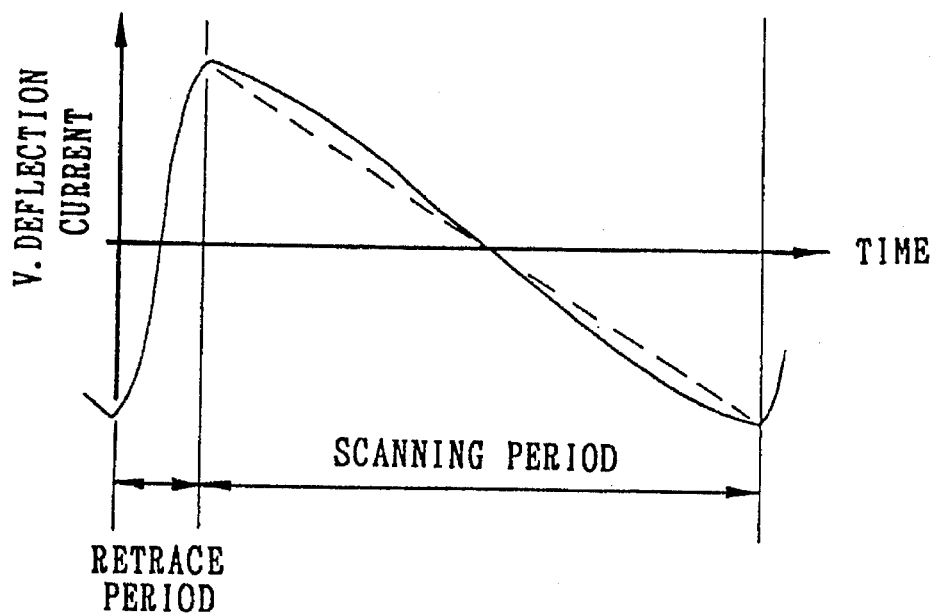
FIG. 14 shows a waveform of a vertical deflection current flowing through a vertical deflection coil in FIG. 11.

As a modification of this embodiment 4, the waveform of the vertical reference sawtooth wave is generated by an integrated circuit, and is arbitrary changed by control data. In such a case, the integrated circuit is connected to a microcomputer through a bus line and the waveform of the vertical deflection current is controlled by the microcomputer to produce the vertical deflection current such as shown in FIG. 14. That is the vertical deflection current is produced by the so-called bus control. Further, it is possible to obtain the characteristics shown in FIG. 13 by writing a video signal in a memory (frame memory) device and reading it by time axis modulation as in the third embodiment for realizing the first display method.

5th Embodiment

Figure 15:
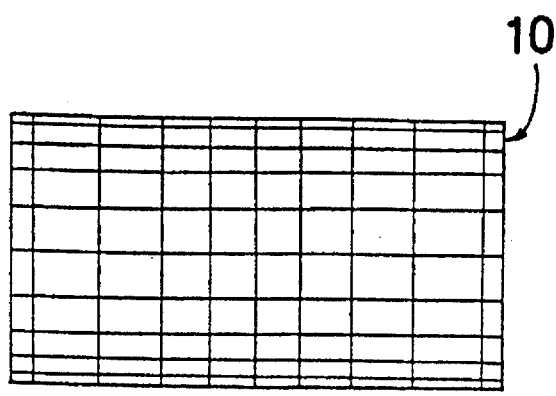
FIG. 15 illustrates a third display method for solving the problem in displaying the video image of 4:3 aspect ratio on the display device having the display screen having the aspect ratio of 16:9.

A third display method for solving the problem in displaying the video image having the aspect ratio of 4:3 on the display screen having the aspect ratio of 16:9 is to expand the horizontal display scale of image with the expansion rate increasing with the increase of distance from the center of the screen 10 and to compress the vertical display scale with the compression rate being larger with the increase of vertical distance from the center of the screen 10 as shown by a cross-hatch pattern in FIG. 15. This can be realized by combining the circuit for the first display method shown in FIGS. 3 or 9 and the circuit for the second display method shown in FIG. 11.

It should be noted that the first, second and third display methods can be combined with the conceivable display methods shown in FIG. 1.

In the examples of display of the cross-hatch pattern shown in FIGS. 4, 12 and 15, an upper and lower portions or right and left portions of the image on the display screen 10 are considerably distorted. However, an important portion of the displayed image in the central area of the display screen which is about 80% of a total display area thereof, is maintained substantially normal of its aspect ratio of 4:3, therefore, such distortions caused at rim portions of the image can easily be overlooked thus are insignificant.

Further, when the horizontal display scale is expanded at both end portions of image with respect to the center portion thereof as in the first display method, it is possible to give the viewer a feeling of perspective view due to the fact that the central portion of the image is relatively compressed with respect to the both end portions thereof.

Next, fourth to sixth display methods for solving a problem in displaying a video image having an aspect ratio of 16:9 on a display screen having an aspect ratio of 4:3 and embodiments for realizing these display methods will be described with reference to FIGS. 16 to 24.

6th Embodiment

Figure 17:
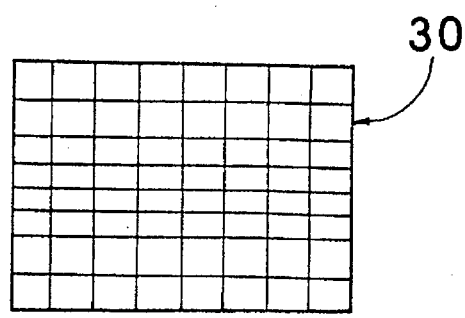
FIG. 17 illustrates the fourth display method for solving the problem in displaying the video image of 16:9 aspect ratio on the display device having the display screen having the aspect ratio of 4:3.

The fourth method for solving the problem in displaying the video image having the aspect ratio of 16:9 on the display screen whose aspect ratio of 4:3 of the display device, is to expand a vertical display scale of upper and lower portions of image with respect to a center portion of the image with an expansion rate being increased with an increase of vertical distance from the center as shown by the cross-hatch pattern in FIG. 17. In this case, although the upper and lower portions of the image on a screen 30 are distorted, the the aspect ratio of the image in the center portion thereof is maintained at substantially 16:9.

Figure 18:
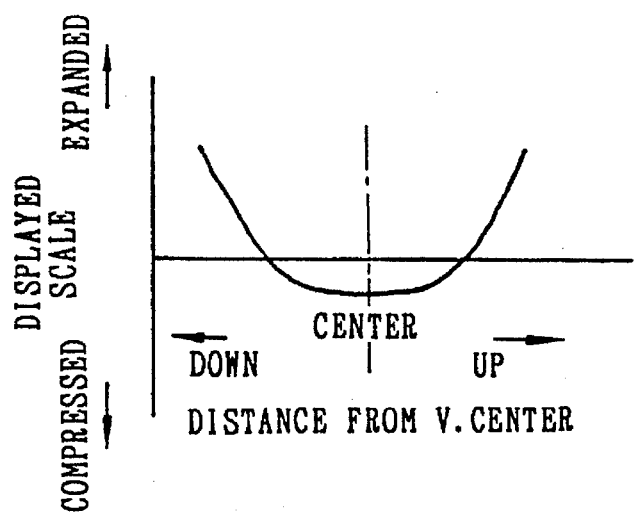
FIG. 18 shows a relationship between a vertical position and a display scale in the fourth display method shown in FIG. 17.

FIG. 18 shows a relation between a vertical position and a vertical display scale of image (displayed length per unit time) on the display screen. That is, an ordinate indicates the display scale and an abscissa indicates a vertical distance from the center of the screen. The horizontal length of the image is linearly adjusted to fill the screen, which corresponds to the state shown in FIG. 2(C). It is clear from FIG. 18, that the vertical display scale of image is compressed substantially constant in the center portion of the image and expanded gradually with the expansion rate being increased with the increase of vertical distance from the center. Thus, the fourth display method performs to display the video image having the aspect ratio of 16:9 on the whole area of the display screen having the aspect ratio of 4:3 by relatively expanding the vertical display scale of the upper and lower portions of the image with respect to the center portion.

A circuit construction for realizing the above mentioned fourth display method will be described with reference to FIG. 16. In this embodiment 6, the video image display device comprises a cathode ray tube (not shown). This circuit uses a vertical deflection circuit similar to the one in the circuit shown in FIG. 11 used to realize the second display method shown in FIG. 12.

The vertical deflection circuit in this embodiment 6 comprises a reference sawtooth wave generator circuit 31, a vertical drive circuit 32, a vertical output circuit 33, a vertical deflection coil 34, a deflection current detecting resistor 35 and linearity correction circuits 36 and 37. The linearity correction circuit 36 comprises a D.C. component detection circuit.

Since a deflection center of electron beam of the cathode ray tube is not coincident with a center of curvature of the screen which is rather substantially flat, the displayed image is expanded in both top and bottom portions thereof when the vertical deflection current flowing through the deflection coil 34 is linearly changed with respect to time. Therefore, in general, the change of the vertical deflection current is limited at start and end portions of the vertical scanning period as shown by a dotted line in FIG. 19. This maintains the linearity of the display scale of image in normal.

Figure 16:
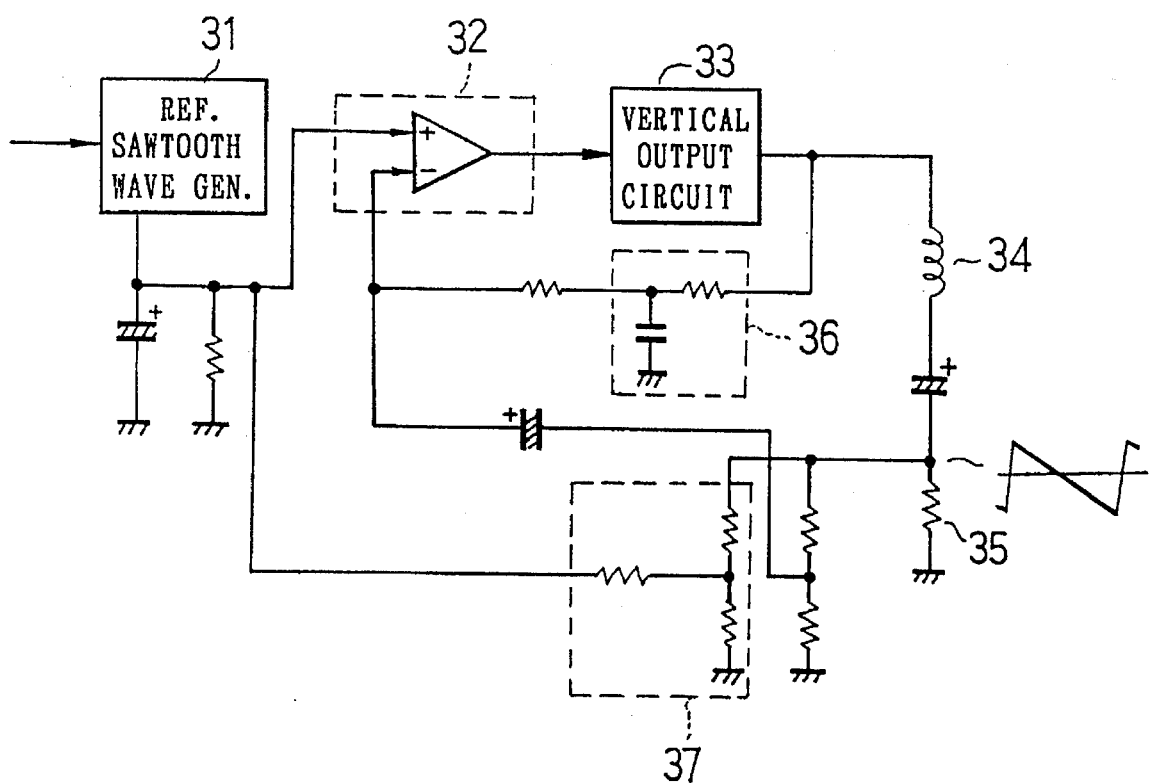
FIG. 16 shows a circuit diagram of a sixth embodiment of the present invention implementing a fourth display method for solving the problem in displaying a video image of 16:9 aspect ratio on a display device having a display screen having the aspect ratio of 4:3.
Figure 19:
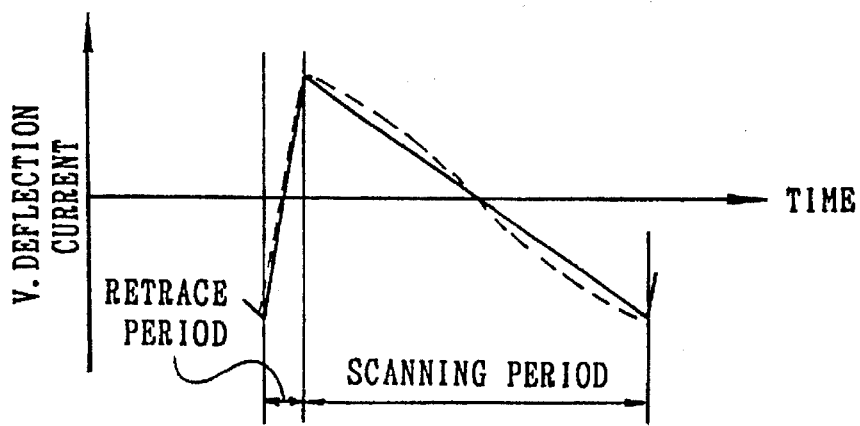
FIG. 19 shows a waveform of a vertical deflection current flowing through a vertical deflection coil in FIG. 16.

In the vertical deflection circuit of this embodiment 6 shown in FIG. 16, the display characteristics shown in FIG. 17 is realized by adjusting a capacitance of a capacitor constituting the linearity correction circuit 36 and adjusting a dividing ratio of voltage dividing resistor constituting the linearity correction circuit 37 to thereby reduce an amount of correction of the linearity correction circuits 36 and 37 so that vertical deflection current flowing through the vertical deflection coil 34 becomes closer to a linear line shown by a solid line in FIG. 19.

7th Embodiment

Figure 21:
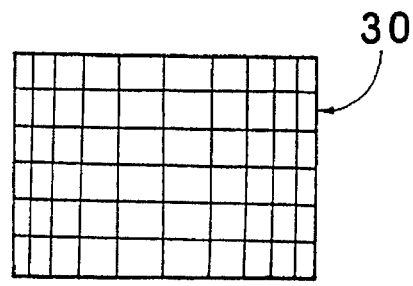
FIG. 21 illustrates the fifth display method for solving the problem in displaying the video image of 16:9 aspect ratio on the display device having the display screen having the aspect ratio of 4:3.

A fifth display method for solving the problem in displaying the video image having the aspect ratio of 16:9 on the display screen 30 whose aspect ratio is 4:3, is to compress a horizontal display scale of right and left portions of the image with respect to a center portion thereof with the compression rate being increased with the increase of horizontal distance from the center, as shown by the cross-hatch pattern in FIG. 21. In this case, although right and left portions of the image on the screen 30 are distorted, the aspect ratio of the image in the center portion of the screen is maintained at substantially 16:9.

Figure 22:
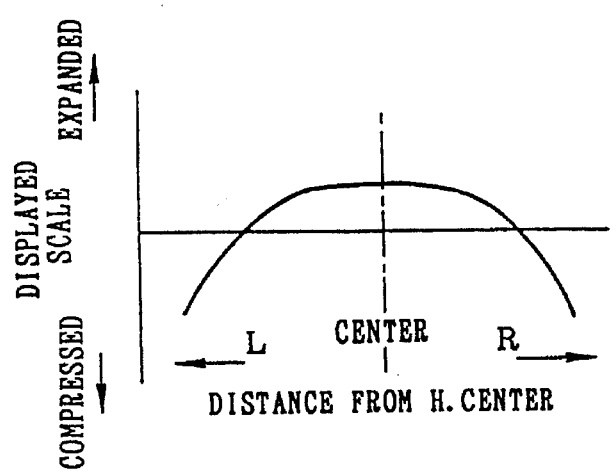
FIG. 22 shows a relationship between a horizontal position and a display scale in the fifth display method shown in FIG. 21.
Figure 23:
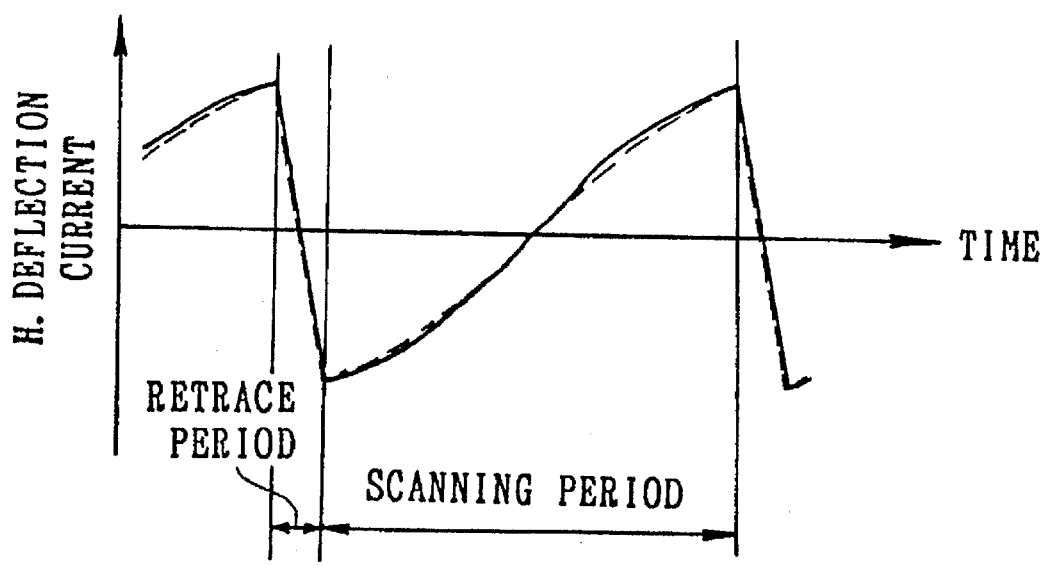
FIG. 23 shows a waveform of a horizontal deflection current flowing through a horizontal deflection coil in FIG. 20.

FIG. 22 shows a relation between a horizontal position and a horizontal display scale of image (displayed length per unit time). That is, an ordinate indicates the horizontal display scale and an abscissa indicates a horizontal distance from the center of the screen. The vertical length of the image is linearly adjusted to fill the screen, which corresponds to the state shown in FIG. 2(C). It is clear from FIG. 22, that the horizontal display scale of image is expanded substantially constant in the center portion of the image and compressed gradually with the compression rate being increased with the increase of the horizontal distance from the center the screen. Thus, the fifth display method performs to display the video image having the aspect ratio of 16:9 on the whole area of the display screen having the aspect ratio of 4:3 by relatively compressing the horizontal display scale with respect to the center portion of the image.

A circuit construction for realizing the above mentioned fifth display method will be described with reference to FIG. 20. In this embodiment 7, the video image display device comprises a cathode ray tube (not shown). This circuit uses a horizontal deflection output circuit similar to the one in the circuit construction shown in FIG. 3 used to realize the first display method shown in FIG. 4.

The horizontal deflection output circuit comprises a horizontal output transistor 41, a damper diode 42, a resonance capacitor 43, a horizontal deflection coil 44, an S-correction capacitor 45, a flyback transformer (or horizontal output transformer) 46, an S-correction capacitor 47 and a switch 48 for selectively connecting the S-correction capacitor 47 in parallel to the S-correction capacitor 45.

As mentioned previously for the vertical deflection, when a horizontal deflection current is linearly changed, both end portions of the displayed image are expanded relatively to the center portion thereof. In order to maintain the visible horizontal linearity, a variation of the horizontal deflection current is limited at start and end portions of the horizontal scanning period as shown by a dotted line in FIG. 23.

Figure 2:
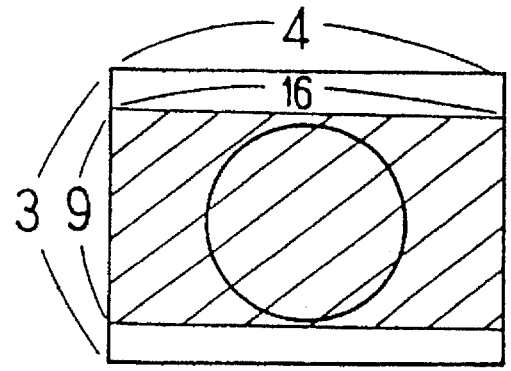
FIGS. 2 (A) through (C) illustrate a conceivable method for displaying a video image of 16:9 aspect ratio on a display device having a display screen having an aspect ratio of 4:3.
Figure 2:
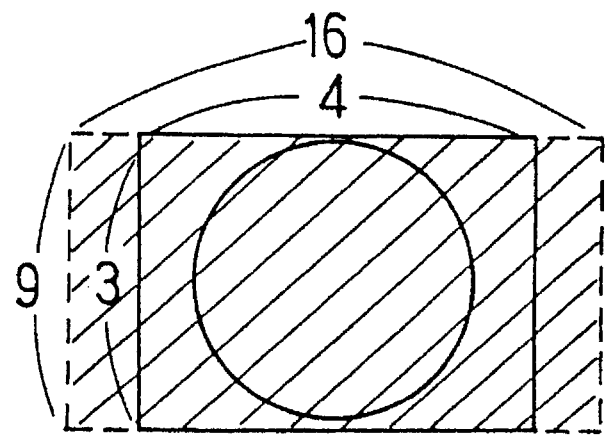
Figure 2:
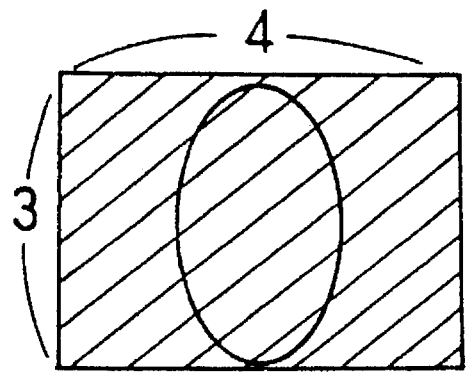
Figure 20:
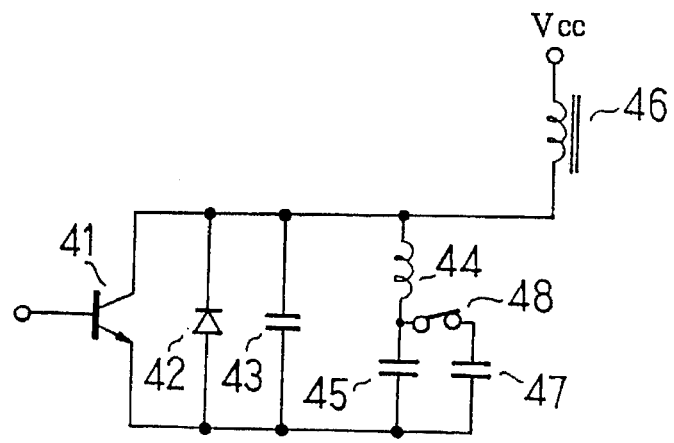
FIG. 20 shows a block circuit diagram of a seventh embodiment of the present invention for realizing a fifth display method for solving the problem in displaying the video image of 16:9 aspect ratio on the display device having the display screen having the aspect ratio of 4:3.

In FIG. 20, a total capacitance of the S-correction capacitors 45 and 47 is selected as such that, when the image is displayed on the display screen as shown in FIG. 2(C) by closing the switch 8 and suitably selecting a source voltage Vcc to be applied to the transformer 6, so that the horizontal length of the image is adjusted to fill the screen. Further, when it is desired to display the image such as shown in FIG. 21, the switch 8 is made open. By this, the total capacitance of S-correction capacitor is reduced and a horizontal deflection current flowing through the horizontal deflection coil 44 is modulated such that its variation at the start and end portions of scanning period is further limited as shown by a solid line in FIG. 23, realizing the display characteristics shown in FIG. 21.

8th Embodiment

Figure 24:
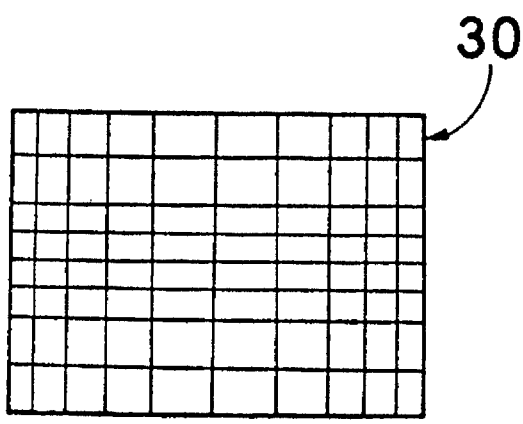
FIG. 24 illustrates a sixth display method for solving the problem in displaying the video image of 16:9 aspect ratio on the display device having the display screen having the aspect ratio of 4:3.

A sixth display method for solving the problem in displaying the video image having the aspect ratio of 16:9 on the display screen 30 whose aspect ratio of 4:3 of the display device is to expand the vertical display scale of upper and lower portions of the image with respect to the center portion thereof with the expansion rate being increased with the increase of vertical distance from the center as shown by the cross-hatch pattern in FIG. 24 and to compress the horizontal display scale of right and left portions of the image with respect to the center portion of the image with the compression rate being increased with the increase of horizontal distance from the center. This is achieved by combining the circuit for realizing the fourth display method shown in FIG. 16 and the circuit for realizing the fifth display method shown in FIG. 20.

It should be noted that the fourth, fifth and sixth display methods for solving the problem in displaying the video image having the aspect ratio of 16:9 on the display screen having the aspect ratio of 4:3 can be combined with the conventional display method shown in FIG. 1.

Further, the fourth, fifth and sixth display methods can be applied to display the so-called vista size video image whose visible picture has a 16:9 aspect ratio, by expanding the vista image vertically filling the normally unused blank areas of the screen.

As shown by the cross-hatch pattern shown in FIGS. 17, 21 and 24, right and left portions or upper and lower portions of the video image are distorted. However, an important portion of the displayed image in the central area of the display screen which is about 80% of a total display area thereof, is maintained substantially normal of its aspect ratio of 4:3, therefore, such distortions caused at rim portions of the image can easily be overlooked thus are insignificant.

The display device having the display screen whose aspect ratio is 16:9 or 4:3 is not limited to an image display device using a cathode ray tube and is applicable to liquid crystal display devices, plasma display devices or to image projection systems etc. by non-linearly, i.e. partially expanding or compressing their deflection scales vertically or horizontally or both. The described embodiments can, of course, be modified in various manners without departing from the true scope of the present invention.

As described in the foregoing, according to the present invention, in displaying a video image of 4:3 aspect ratio on a display device of 16:9 aspect ratio, a horizontal display scale of the image is expanded partially in right and left portions of the image with respect to a horizontal center portion thereof with the expansion rate being increased with an increase of distance from the horizontal center of the screen, or a vertical display scale of the image is partially compressed in upper and lower portions of the image with respect to a vertical center portion thereof with the compression rate being increased with an increase of distance from the vertical center of the screen.

Therefore, it is possible to display the video image having its aspect ratio of 4:3 substantially on the whole area of the display screen having the aspect ratio of 16:9 without loss of the image maintaining its original aspect ratio in the center portion of the screen.

Further, in displaying a video image of 16:9 aspect ratio on a display device of 4:3 aspect ratio, a vertical display scale of the image is partially expanded in upper and lower portions of the image with respect to a vertical center portion thereof with the expansion rate being increased with an increase of distance from the horizontal center or a horizontal display scale of image is partially compressed on right and left portions of the image with respect to the horizontal center portion thereof with the compression rate being increased with an increase of distance from the horizontal center of the screen. Therefore, it is possible to display the video image having the aspect ratio of 16:9 substantially on the whole area of the display screen having the aspect ratio of 4:3 without loss of image and maintaining its original aspect ratio in the center portion of the screen.

What is claimed is:

1. A display device for displaying a video image having an original 4:3 aspect ratio while substantially maintaining the original picture information thereof, said video image being transmitted without being compressed, said display device comprising first means having a display screen of 16:9 aspect ratio for displaying said video image of 4:3 aspect ratio, and said display device further comprising at least one of:

second means for non-linearly expanding in display scale on said display screen a horizontal display scale of said video image being fully displayed to fill up said display screen, in right and left portions of said video image with respect to a horizontal center portion of said video image in such a manner that a rate of non-linear expansion is increased as a horizontal position within said video image becomes distant from a horizontal center of said video image; and third means for non-linearly compressing in display scale on said display screen a vertical display scale of said video image being fully displayed to fill up said display screen, in upper and lower portions of said video image with respect to a vertical center portion of said video image in such a manner that a rate of non-linear compression is increased as a vertical position within said video image becomes distant from a vertical center of said video image.

2. A display device claimed in claim 1, wherein said second means comprises a horizontal deflection circuit for non-linearly expanding in display scale on said display screen a horizontal display scale of said video image by regulating a deflection current of said horizontal deflection current.

3. A display device claimed in claim 1, wherein said third means comprises a vertical deflection circuit for non-linearly compressing in display scale on said display screen a vertical display scale of said video image by regulating a deflection current of said vertical deflection current.

4. A display device claimed in claim 1, wherein said second means comprises memory means in which a signal of said video image is written, and the signal thus written is read out of the memory means by using an FM modulated clock.

5. A display device for displaying a video image having an original 16:9 aspect ratio while substantially maintaining the original picture information thereof, said video image being transmitted without being compressed, said display device comprising first means having a display screen of 4:3 aspect ratio for displaying said video image of 16:9 aspect ratio, and said display device further comprising at least one of:

second means for non-linearly compressing in display scale on said display screen a horizontal display scale of said video image being fully displayed to fill up said display screen, in right and left portions of said video image with respect to a horizontal center portion of said video image in such a manner that a rate of non-linear compression is increased as a horizontal position within said video image becomes distant from a horizontal center of said video image; and third means for non-linearly expanding in display scale on said display screen a vertical display scale of said video image being fully displayed to fill up said display screen, in upper and lower portions of said video image with respect to a vertical center portion of said video image in such a manner that a rate of non-linear expansion is increased as a vertical position within said video image becomes distant from a vertical center of said video image.

6. A display device claimed in claim 5 wherein said second means comprises a horizontal deflection circuit for non-linearly compressing in display scale on said display screen a horizontal display scale of said video image by regulating a deflection current of said horizontal deflection current.

7. A display device claimed in claim 5, wherein said third means comprises a vertical deflection circuit for non-linearly expanding in display scale on said display screen a vertical display scale of said video image by regulating a deflection current of said vertical deflection current.

8. A display device for displaying a visible picture having an original 16:9 aspect ratio without showing a substantially blank area on a display screen thereof, said visible picture being transmitted as a part of image signal of 4:3 aspect ratio without being compressed, said display device comprising first means having a display screen of 4:3 aspect ratio for displaying said visible picture of 16:9 aspect ratio, and said display device further comprising at least one of:

second means for non-linearly compressing in display scale on said display screen a horizontal display scale of said visible picture being fully displayed to fill up said display screen, in right and left portions of said visible picture with respect to a horizontal center portion of said visible picture in such a manner that a rate of non-linear compression is increased as a horizontal position within said visible picture becomes distant from a horizontal center of said visible picture; and third means for non-linearly expanding in display scale on said display screen a vertical display scale of said visible picture being fully displayed to fill up said display screen, in upper and lower portions of said visible picture with respect to a vertical center portion of said visible picture in such a manner that a rate of non-linear expansion is increased as a vertical position within said visible picture becomes distant from a vertical center of said visible picture.

9. A display device claimed in claim 8, wherein said second means comprises a horizontal deflection circuit for non-linearly compressing in display scale on said display screen a horizontal display scale of said video image by regulating a deflection current of said horizontal deflection current.

10. A display device claimed in claim 8, wherein said third means comprises a vertical deflection circuit for non-linearly expanding in display scale on said display screen a vertical display scale of said video image by regulating a deflection current of said vertical deflection current.

11. A display device for displaying a video image having an original aspect ratio of horizontal to vertical dimensions, said video image being transmitted without being compressed, said display device comprising a display screen of an other aspect ratio of horizontal to vertical dimensions, said other aspect ratio being larger than said original aspect ratio for displaying said video image and said display device further comprising at least one of:

first means for non-linearly expanding in display scale on said display screen a horizontal display scale of said video image being fully displayed by substantially filling up said display screen, in right and left portions of said video image with respect to a horizontal center portion of said video image in such a manner that a rate of non-linear expansion is increased as a horizontal position within said video image becomes distant from a horizontal center of said video image; and second means for non-linearly compressing in display scale on said display screen a vertical display scale of said video image being fully displayed to fill up said display screen, in upper and lower portions of said video image with respect to a vertical center portion of said video image in such a manner that a rate of non-linear compression is increased as a vertical position within said video image becomes distant from a vertical center of said video image.

12. A display device claimed in claim 11, wherein said first means comprises a horizontal deflection circuit for non-linearly expanding in display scale on said display screen a horizontal display scale of said video image by regulating a deflection current of said horizontal deflection current.

13. A display device claimed in claim 11, wherein said second means comprises a vertical deflection circuit for non-linearly compressing in display scale on said display screen a vertical display scale of said video image by regulating a deflection current of said vertical deflection current.

14. A display device claimed in claim 11, wherein said first means comprises memory means in which a signal of said video image is written, and the signal thus written is read out of the memory means by using an FM modulated clock.

15. A display device claimed in claim 11, wherein said original aspect ratio is 4:3, and said other aspect ratio is 16:9.

16. A display device for displaying a video image having an original aspect ratio of horizontal to vertical dimensions, said video image being transmitted without being compressed, said display device comprising a display screen of an other aspect ratio of horizontal to vertical dimensions, said other aspect ratio being smaller than said original aspect ratio for displaying said video image and said display device further comprising at least one of:

first means for non-linearly compressing in display scale on said display screen a horizontal display scale of said video image being fully displayed to fill up said display screen, in right and left portions of said video image with respect to a horizontal center portion of said video image in such a manner that a rate of non-linear compression is increased as a horizontal position within said video image becomes distant from a horizontal center of said video image;
and
second means for non-linearly expanding in display scale on said display screen a vertical display scale of said video image being fully displayed by substantially filling up said display screen, in upper and lower portions of said video image with respect to a vertical center portion of said video image in such a manner that a rate of non-linear expansion is increased as a vertical position within said video image becomes distant from a vertical center of said video image.

17. A display device claimed in claim 16, wherein said first means comprises a horizontal deflection circuit for non-linearly compressing in display scale on said display screen a horizontal display scale of said video image by regulating a deflection current of said horizontal deflection current.

18. A display device claimed in claim 16, wherein said second means comprises a vertical deflection circuit for non-linearly expanding in display scale on said display screen a vertical display scale of said video image by regulating a deflection current of said vertical deflection current.

19. A display device claimed in claim 16, wherein said original aspect ratio is 16:9, and said other aspect ratio is 4:3.

20. A display device for displaying a visible picture having an original aspect ratio of horizontal to vertical dimensions, said visible picture being transmitted as a part of an image signal of an other aspect ratio of horizontal to vertical dimensions without being compressed, said display device comprising a display screen of said other aspect ratio and said other aspect ratio being smaller than said original aspect ratio for displaying said visible picture, and said display device further comprising at least one of:

first means for non-linearly compressing in display scale on said display screen a horizontal display scale of said visible picture being fully displayed to fill up said display screen, in right and left portions of said visible picture with respect to a horizontal center portion of said visible picture in such a manner that a rate of non-linear compression is increased as a horizontal position within said visible picture becomes distant from a horizontal center of said visible picture; and second means for non-linearly expanding in display scale on said display screen a vertical display scale of said visible picture being fully displayed by substantially filling up said display screen, in upper and lower portions of said visible picture with respect to a vertical center portion of said visible picture in such a manner that a rate of non-linear expansion is increased as a vertical position within said visible picture becomes distant frown a vertical center of said visible picture.

21. A display device claimed in claim 20, wherein said first means comprises a horizontal deflection circuit for non-linearly compressing in display scale on said display screen a horizontal display scale of said visible picture by regulating a deflection current of said horizontal deflection current.

22. A display device claimed in claim 20, wherein said second means comprises a vertical deflection circuit for non-linearly expanding in display scale on said display screen a vertical display scale of said visible picture by regulating a deflection current of said vertical deflection current.

23. A display device claimed in claim 20, wherein said original aspect ratio is 16:9, and said other aspect ratio is 4:3.

* * * * *